US012654711B2

(12) United States Patent (10) Patent No.: US 12,654,711 B2

Dadoush et al. (45) Date of Patent: Jun. 16, 2026

(54) SYSTEM AND METHOD FOR PREVENTING DRUNK DRIVING

(71) Applicant: HYUNDAI MOBIS CO., LTD., Seoul (KR)

(72) Inventors: Joseph Ramzi Dadoush, Macomb, MI (US); Salam Said Neshewait, Westland, MI (US)

(73) Assignee: HYUNDAI MOBIS CO., LTD., Seoul (KR)

( * ) Notice: Subject to any disclaimer, the term of this patent is extended or adjusted under 35 U.S.C. 154(b) by 178 days.

(21) Appl. No.: 18/226,991

(22) Filed: Jul. 27, 2023

(65) Prior Publication Data

US 2025/0033647 A1     Jan. 30, 2025

(51) Int. Cl.
B60W 40/08 (2012.01)
B60W 50/12 (2012.01)

(52) U.S. Cl.
CPC ............ B60W 40/08 (2013.01); B60W 50/12 (2013.01); B60W 2420/403 (2013.01); B60W 2540/043 (2020.02); B60W 2540/21 (2020.02); B60W 2540/221 (2020.02); B60W 2540/227 (2020.02); B60W 2540/24 (2013.01)

(58) Field of Classification Search
CPC ........ B60K 28/02; B60K 28/04; B60K 28/06; B60K 28/063; B60K 28/066; B60W 40/08; B60W 50/12; B60W 2040/0836;

B60W 2420/403; B60W 2540/043; B60W 2540/21; B60W 2540/221; B60W 2540/227; B60W 2540/24; G06V 20/597; G06V 40/16

See application file for complete search history.

(56) References Cited

U.S. PATENT DOCUMENTS

| | | | | |
|---|---|---|---|---|
| 6,748,792 | B1 * | 6/2004 | Freund ............... | G07C 9/00563 |
| | | | | 340/426.2 |
| 7,451,852 | B2 * | 11/2008 | Stewart ................ | B60K 28/063 |
| | | | | 340/576 |
| 10,493,996 | B2 * | 12/2019 | Phillips ............. | B60W 50/0098 |
| 10,663,440 | B2 * | 5/2020 | DeVries ............. | G01N 33/4972 |
| 11,793,468 | B2 * | 10/2023 | Williams ............. | A61B 5/6893 |
| 2007/0024454 | A1 * | 2/2007 | Singhal ................. | G08B 21/06 |
| | | | | 340/576 |
| 2007/0200663 | A1 * | 8/2007 | White ................... | B60R 25/255 |
| | | | | 340/5.31 |
| 2007/0239992 | A1 * | 10/2007 | White ................. | B60K 28/063 |
| | | | | 713/186 |
| 2010/0294583 | A1 * | 11/2010 | Biondo ................. | A61B 5/082 |
| | | | | 340/576 |

(Continued)

*Primary Examiner* — Peter D Nolan
*Assistant Examiner* — Ce Li Li
(74) *Attorney, Agent, or Firm* — MORGAN, LEWIS & BOCKIUS LLP

(57) ABSTRACT

A drunk driving prevention system includes a biometric authentication device that performs biometric authentication on a driver step-by-step at a request of startup of a vehicle, a drinking measurement device that measures a drunken state of the driver who completes the biometric authentication, a driver monitoring device that monitors a state of the driver in the vehicle while measuring the drunken state of the driver, and a controller that allows or blocks the startup of the vehicle based on the result of measuring the drunken state of the driver.

14 Claims, 12 Drawing Sheets

(56)                 References Cited

U.S. PATENT DOCUMENTS

| | | | |
|---|---|---|---|
| 2011/0050407 A1* | 3/2011 | Schoenfeld | A61B 10/0051 |
| | | | 340/426.11 |
| 2012/0268259 A1* | 10/2012 | Igel | B60R 25/00 |
| | | | 701/1 |
| 2020/0026838 A1* | 1/2020 | Choi | G06V 40/70 |
| 2021/0171045 A1* | 6/2021 | An | B60W 40/08 |
| 2023/0294514 A1* | 9/2023 | Mohanty | A61B 5/14546 |
| | | | 180/272 |
| 2024/0046782 A1* | 2/2024 | Odakura | G08G 1/052 |

* cited by examiner

BIOMETRIC
AUTHENTICATION DEVICE
160

FINGERPRINT
AUTHENTICATION MODULE
161

INTERACTIVE AI MODULE
165

SYSTEM AND METHOD FOR PREVENTING DRUNK DRIVING

TECHNICAL FIELD

The present disclosure relates to a system and method for preventing drunk driving.

BACKGROUND

Drunk driving is a factor that accounts for a large part of vehicle accidents, and a large number of deaths occur every year due to drunk driving accidents.

Nowadays, to prevent drunk driving accidents, a system for measuring a driver's drunken state is being built in a vehicle. In particular, in some countries, laws are being made to apply a system for measuring a driver's drunken state to a vehicle.

As such, when a driver attempts to drive, a system for measuring the driver's drunken state in a vehicle may measures the driver's drunken state. When the driver is in a drunken state, the system may prevent a drunken accident by preventing the vehicle from starting.

However, there may be cases where a passenger performs a sobriety test instead of a drunk driver. In this case, as the sobriety test is successful and the vehicle is allowed to start, it may eventually lead to a drunk driving accident.

SUMMARY

The present disclosure has been made to solve the above-mentioned problems occurring in the prior art while advantages achieved by the prior art are maintained intact.

An aspect of the present disclosure provides a system and method for preventing drunk driving. The system and method for preventing drunk driving may make it easy to check a driver and to measure a sobriety test by simultaneously monitoring states of the driver and a passenger in a vehicle when the driver performs a sobriety test while driver authentication is performed through several steps, and may prevent a drunk driving accident by blocking vehicle starting when the driver is in drunken state.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a drunk driving prevention system includes a biometric authentication device that performs biometric authentication on a driver step-by-step at a request of startup of a vehicle, a drinking measurement device that measures a drunken state of the driver who completes the biometric authentication, a driver monitoring device that monitors a state of the driver in the vehicle while measuring the drunken state of the driver, and a controller that allows or blocks the startup of the vehicle based on a result of the measuring of the drunken state of the driver.

In an embodiment, the biometric authentication device performs the biometric authentication of the driver step-by-step by using fingerprint recognition of the driver, speech recognition of the driver, and question and answer through conversation with the driver.

In an embodiment, the biometric authentication device includes a fingerprint recognition module that recognizes the driver by determining whether a fingerprint obtained from the driver matches a pre-registered fingerprint of the driver, and an interactive artificial intelligence (AI) module that query the driver by recognizing a voice of the driver, and to recognize the driver from an answer of the driver to the query.

In an embodiment, the controller is further configured to activate a drinking measurement function and a driver state monitoring function when the biometric authentication of the driver is successful.

In an embodiment, the drinking measurement device measures the drunken state of the driver by comparing alcohol concentration information of the driver obtained from a drinking measurement sensor installed in the vehicle with a predetermined first reference value and a predetermined second reference value, when the drinking measurement function is activated.

In an embodiment, the predetermined first reference value is set to a blood alcohol concentration value for determining whether alcohol is drunk, and the predetermined second reference value is set to a legal limit of blood alcohol concentration determined by a country.

In an embodiment, the drinking measurement device determines that the driver is not in the drunken state when alcohol concentration of the driver is equal to or less than the predetermined first reference value. The controller allows the startup of the vehicle, when it is identified that the driver is not in the drunken state.

In an embodiment, the drinking measurement device determines that the driver is in a legally acceptable drunken state when alcohol concentration of the driver exceeds the predetermined first reference value and is equal to or less than the predetermined second reference value, and the controller allows the startup of the vehicle, and activates the driver state monitoring function during the startup of the vehicle, when it is determined that the driver is in the legally acceptable drunken state.

In an embodiment, the drinking measurement device determines that the driver is in the drunken state when alcohol concentration of the driver exceeds the predetermined second reference value, and the controller blocks the startup of the vehicle, when it is identified that the driver is in the drunken state.

In an embodiment, the driver monitoring device monitors the state of the driver while drinking measurement of the driver is being performed, and determines whether a subject for drinking measurement is the driver, when the driver monitoring function is activated.

In an embodiment, the driver monitoring device determines whether the subject for drinking measurement is the driver, by analyzing whether a passenger is boarding, or identifying locations of the driver and the passenger in the vehicle.

In an embodiment, the controller guides the driver to re-measure a drunken state and re-measures the drunken state of the driver when it is identified that the subject for drinking measurement is not the driver.

According to an aspect of the present disclosure, a method for preventing drunk driving includes performing, by a biometric authentication device, biometric authentication on a driver step-by-step at a request of startup of a vehicle, measuring, by a drinking measurement device, a drunken state of the driver who completes the biometric authentication, monitoring, by a driver monitoring device, a state of the driver in the vehicle while measuring the drunken state of the driver, and allowing or blocking, by a controller, the startup of the vehicle based on a result of the measuring of the drunken state of the driver.

In an embodiment, the performing of the biometric authentication step-by-step includes performing the biometric authentication through fingerprint recognition of the driver, performing the biometric authentication through speech recognition of the driver, and performing the biometric authentication by using a question and answer through conversation with the driver by driving the interactive AI module.

In an embodiment, the method further includes activating, by the controller, a drinking measurement function and a driver state monitoring function in response to a successful biometric authentication of the driver.

In an embodiment, the measuring of the drunken state includes comparing, by the drinking measurement device, alcohol concentration information of the driver obtained from a drinking measurement sensor installed in the vehicle with a predetermined first reference value and a predetermined second reference value in response to the activation of the drinking measurement function, and determining, by the drinking measurement device, that: the driver is not in the drunken state in response to an alcohol concentration of the driver being equal to or less than the predetermined first reference value, the driver is in a legally acceptable drunken state in response to the alcohol concentration of the driver exceeding the predetermined first reference value and being equal to or less than the second reference value, and the driver is in the drunken state in response to the alcohol concentration of the driver exceeding the second reference value.

In an embodiment, the predetermined first reference value is set to a blood alcohol concentration value for determining whether alcohol is drunk, and the predetermined second reference value is set to a legal limit of blood alcohol concentration determined by a country.

In an embodiment, the allowing or blocking of the startup of the vehicle includes allowing, by the controller, the startup of the vehicle in response to identification that the driver is not in the drunken state, allowing, by the controller, the startup of the vehicle, and activating the driver state monitoring function during the startup of the vehicle in response to identification that the driver is in the legally acceptable drunken state, and blocking, by the controller, the startup of the vehicle in response to identification that the driver is in the drunken state.

In an embodiment, the monitoring of the state of the driver includes determining, by the driver monitoring device, whether a subject for drinking measurement is the driver, by analyzing whether a passenger is boarding, or identifying locations of the driver and the passenger in the vehicle, while drinking measurement of the driver is performed in response to the activation of the driver state monitoring function.

In an embodiment, the method according to an embodiment of the present disclosure further includes guiding, by the controller, the driver to re-measure a drunken state and re-measuring, by the controller, the drunken state of the driver in response to the identification that the subject for alcohol testing is not the driver.

BRIEF DESCRIPTION OF THE DRAWINGS

The above and other objects, features and advantages of the present disclosure will be more apparent from the following detailed description taken in conjunction with the accompanying drawings:

FIG. 3 is a diagram showing a detailed configuration of a biometric authentication device, according to an embodiment of the present disclosure;

DETAILED DESCRIPTION

Figure 1:
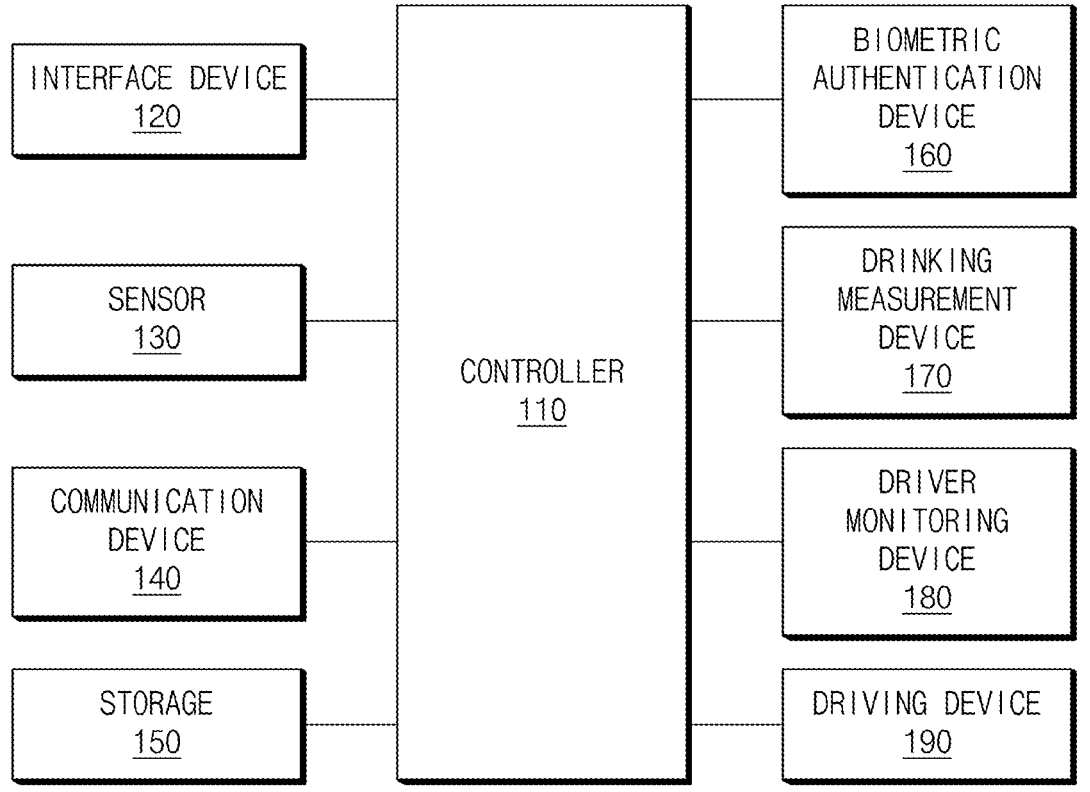
FIG. 1 is a diagram showing a configuration of a drunk driving prevention system, according to an embodiment of the present disclosure.

Hereinafter, some embodiments of the present disclosure will be described in detail with reference to the accompanying drawings. In adding reference numerals to components of each drawing, it should be noted that the same components have the same reference numerals, although they are indicated on another drawing. In describing embodiments of the present disclosure, detailed descriptions associated with well-known functions or configurations will be omitted when they may make subject matters of the present disclosure unnecessarily obscure.

In describing components of embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Figure 2:
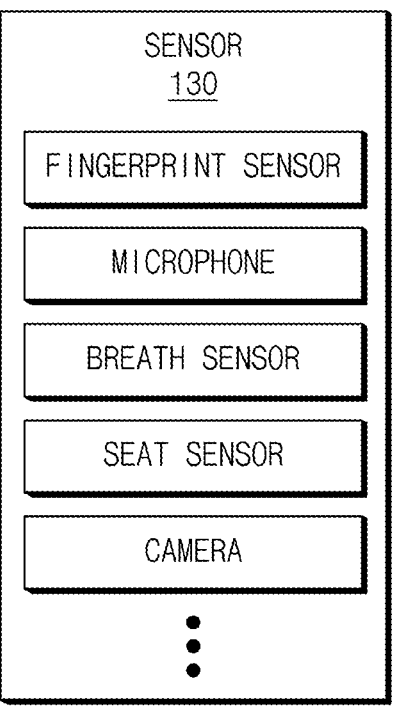
FIG. 2 is a diagram showing a detailed configuration of a sensor, according to an embodiment of the present disclosure.
Figure 3:
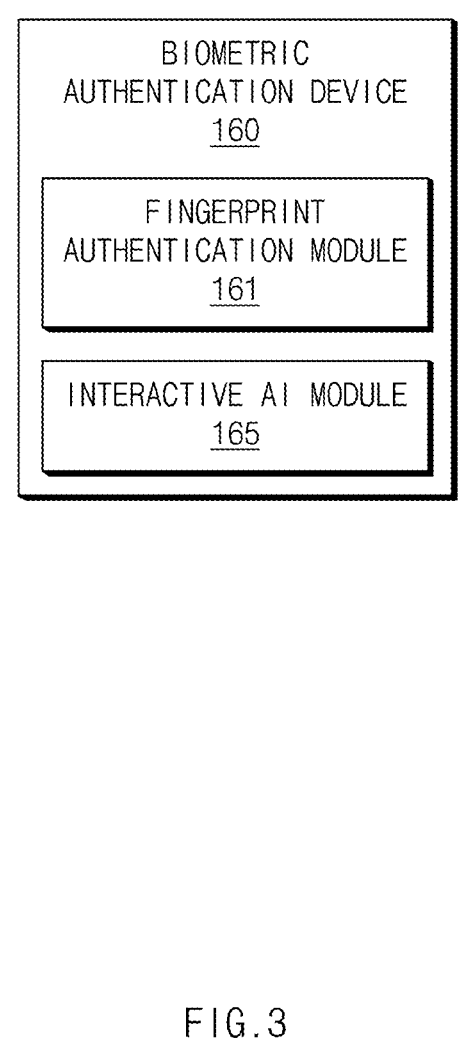

FIG. 1 is a diagram showing a configuration of a drunk driving prevention system, according to an embodiment of the present disclosure. FIG. 2 is a diagram showing a detailed configuration of a sensor, according to an embodiment of the present disclosure. FIG. 3 is a diagram showing a detailed configuration of a biometric authentication device, according to an embodiment of the present disclosure.

A drunk driving prevention system according to an embodiment of the present disclosure may be implemented inside a vehicle. At this time, the drunk driving prevention system may be integrated with internal control units of a vehicle and may be implemented with a separate device so as to be connected to control units of the vehicle by means of a separate connection means.

Referring to FIG. 1, a drunk driving prevention system according to an embodiment of the present disclosure may include a controller 110, an interface device 120, a sensor 130, a communication device 140, a storage 150, a biometric authentication device 160, and a drinking measurement device 170, a driver monitoring device 180 and a driving device 190. Here, the controller 110, the biometric authentication device 160, the drinking measurement device 170, and/or the driver monitoring device 180 of the drunk driving prevention system according to an embodiment of the present disclosure may be implemented as at least one processor.

The controller 110 may be connected to each component of the drunk driving prevention system to perform overall functions of the drunk driving prevention system. Here, the controller 110 may be a hardware device such as a processor or a central processing unit (CPU), or a program implemented by a processor.

The interface device 120 may include an input means for receiving a predetermined control command and an output means for outputting the operating state and result of the drunk driving prevention system.

Herein, the input means may include a key button and may include a soft key implemented on a display. Herein, the input means may include a mouse, a joystick, a jog shuttle, a stylus pen, and the like.

The output means may include a display and may include a voice output means such as a speaker. At this time, when a touch sensor such as a touch film, a touch sheet, or a touch pad is included in the display, the display may operate as a touch screen and may be implemented in the form in which the input means and the output means are integrated with each other.

The sensor 130 may include a sensor for obtaining information for biometric authentication of a driver, a sensor for detecting alcohol concentration in the driver's body, and a sensor for detecting the state of the driver. The detailed configuration of the sensor 130 is described with reference to the example of FIG. 2.

Referring to FIG. 2, the sensor 130 may include a fingerprint sensor, a microphone, a breath sensor, a seat sensor, and a camera.

Figure 4:
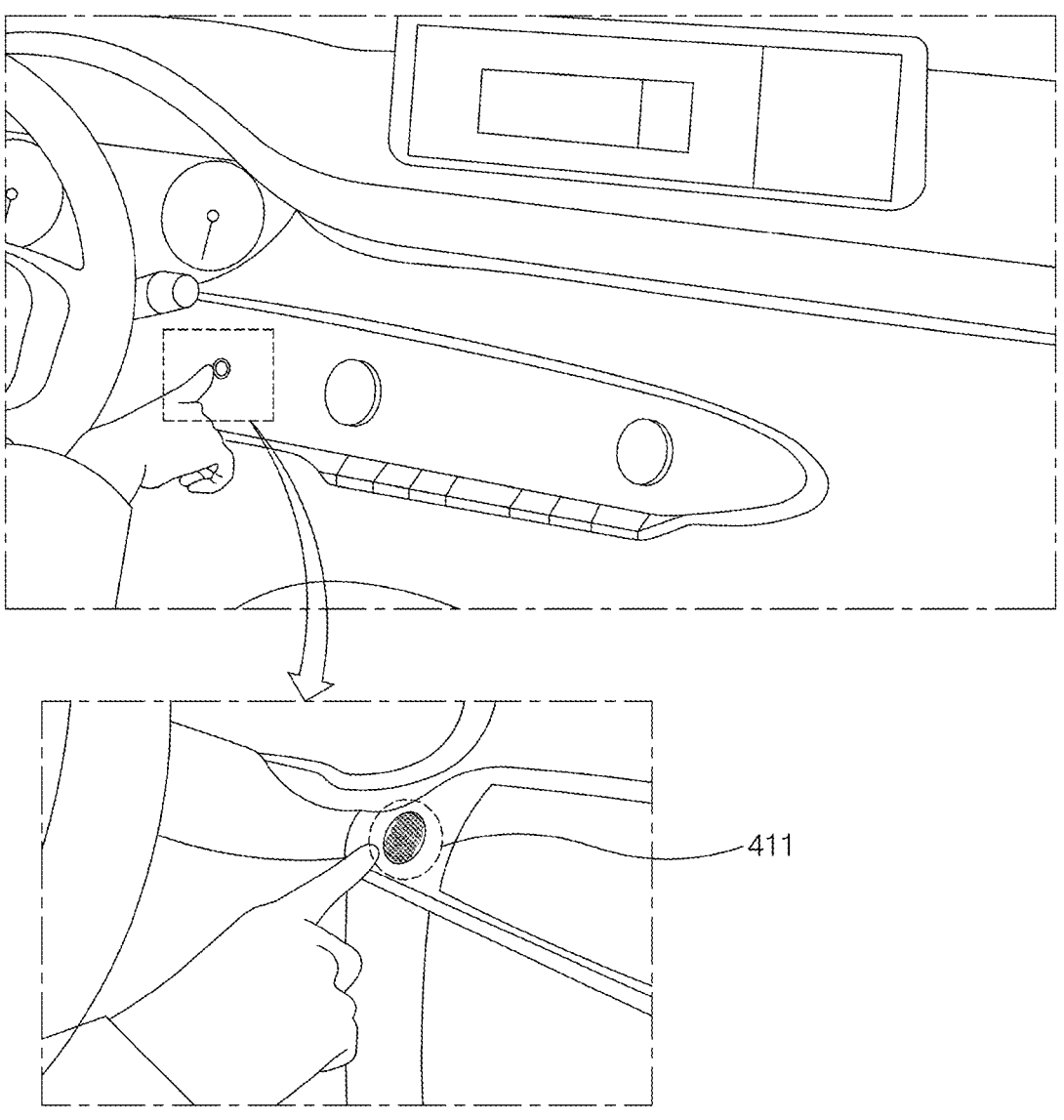
FIGS. 4, 5A, and 5B are diagrams used to describe a biometric authentication operation, according to an embodiment of the present disclosure.

The fingerprint sensor refers to a sensor that obtains scan data by scanning a fingerprint for driver's biometric authentication. An embodiment of a fingerprint sensor will be described with reference to FIG. 4. As shown in FIG. 4, the fingerprint sensor may be installed on a start button 411. Besides, the fingerprint sensor may be installed at a location, at which the driver is capable of easily touching the fingerprint sensor while the driver is seated, such as a dashboard, a steering wheel, or a shift lever.

Like the fingerprint sensor, the microphone is a sensor that obtains voice data for biometric authentication of the driver. For example, the microphone may be installed on a steering wheel or dashboard of a vehicle.

Figure 5A:
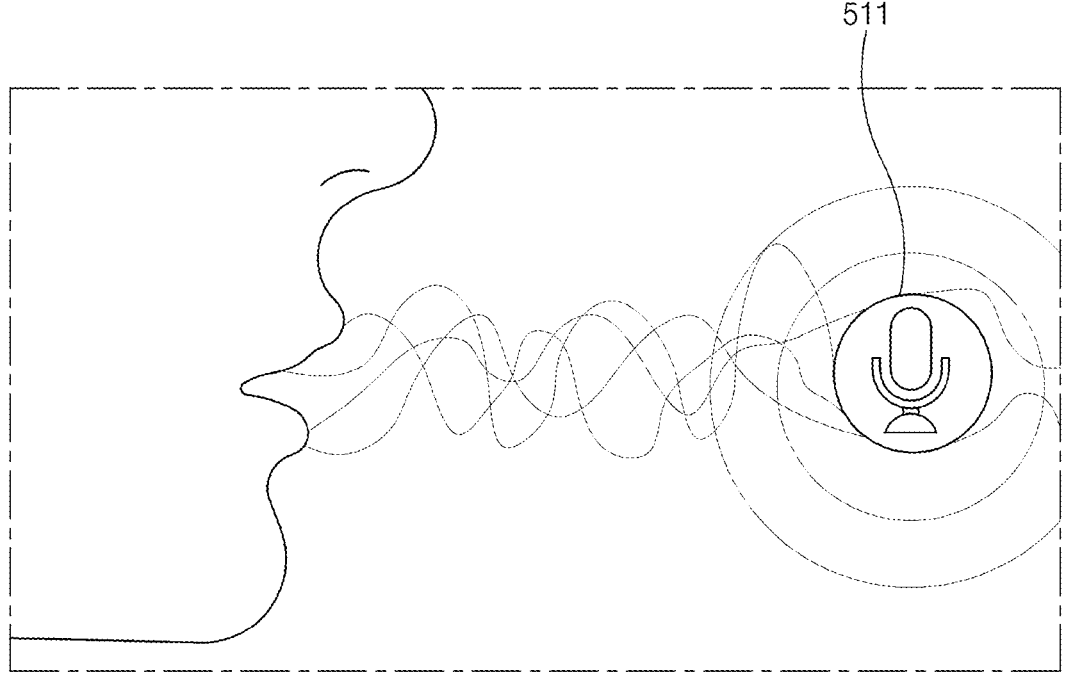
Figure 5B:
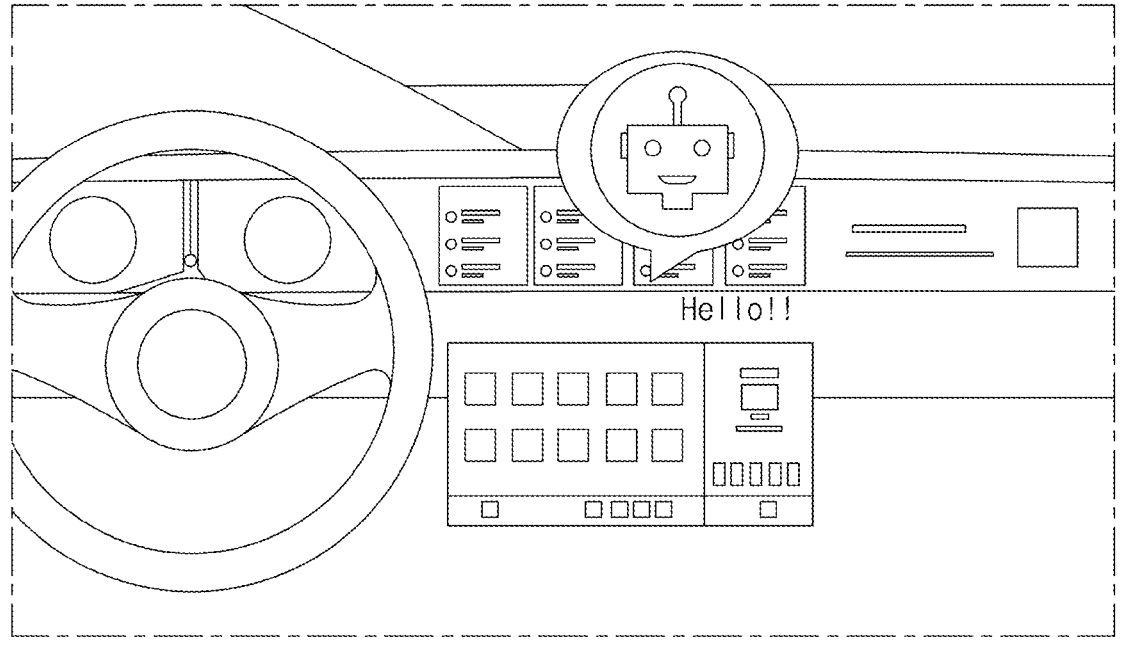

An embodiment of the driver's biometric authentication operation using the microphone will be described with reference to FIGS. 5A and 5B. As shown in FIG. 5A, when the microphone obtains the driver's voice data and provides the voice data to the biometric authentication device 160, the biometric authentication device 160 performs biometric authentication by using the driver's voice data as shown in FIG. 5B. At this time, the biometric authentication device 160 may include an interactive AI module 165 to query the driver, and may perform biometric authentication of the driver based on the driver's answer to the query.

When there is a startup request from the driver, the fingerprint sensor and the microphone may be activated for biometric authentication of the driver.

Figure 6A:
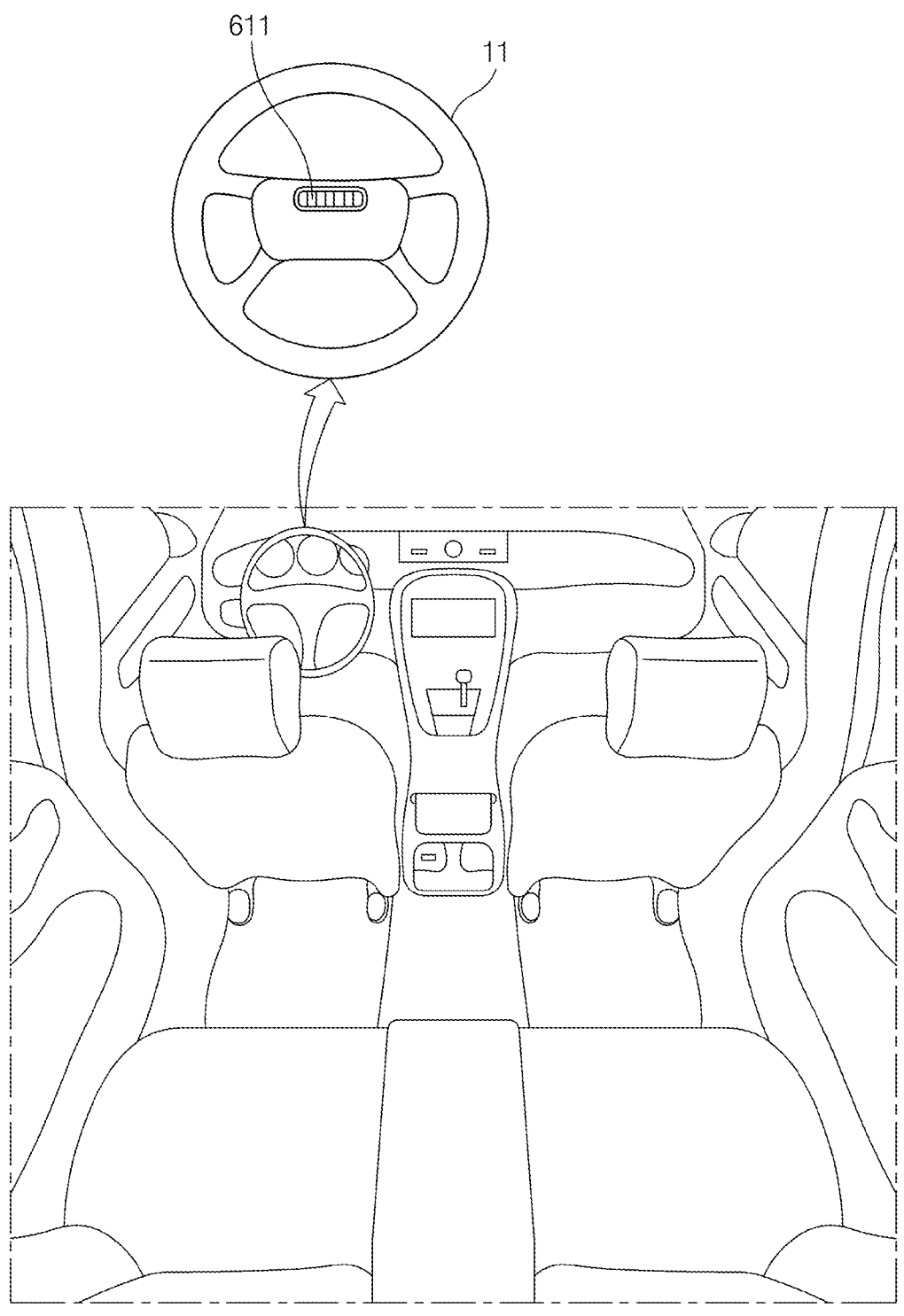
FIGS. 6A and 6B are diagrams used to describe a drinking measurement operation, according to an embodiment of the present disclosure.
Figure 6B:
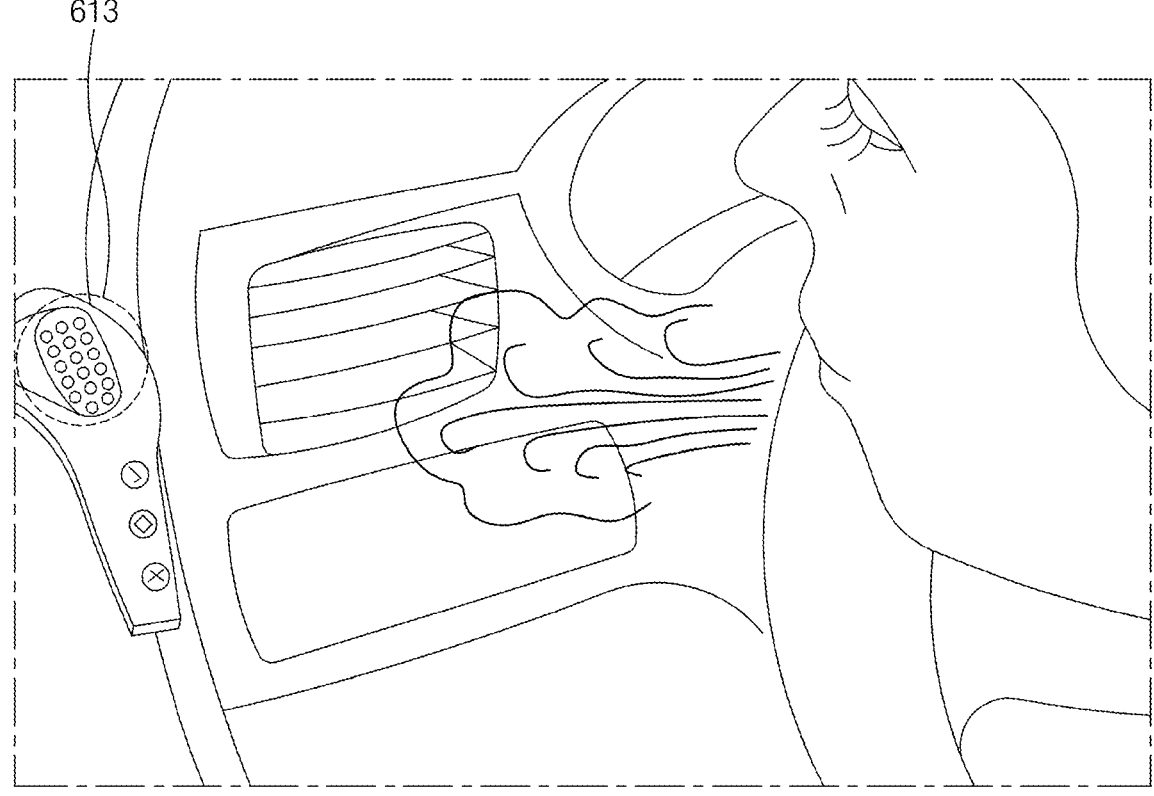

The breath sensor refers to a sensor that obtains breath data for measuring the driver's drunken state. Here, the breath data may include information about the driver's respiratory volume and an alcohol component in the inhaled breath. The breath sensor may be provided with a fan (not shown) operating to suck the driver's breathing into the sensor. An embodiment of the breath sensor will be described with reference to FIGS. 6A and 6B. The breath sensor may be installed at a location where the exhaled breath of the driver is capable of being easily sucked at the periphery of the driver's seat. For example, the breath sensor may be installed on a steering wheel, a dashboard, or the like. A breath sensor 611 installed on a steering wheel 11 may be represented as shown in FIG. 6A. Moreover, a breath sensor 613 installed on the dashboard may be represented as shown in FIG. 6B.

In this case, the breath sensor may measure the driver's respiratory volume, and the controller 110 may determine whether the driver's respiratory volume is sufficient to measure a drunken state. When the driver's respiratory volume is not insufficient, the controller 110 may request the driver to exhale more respiratory volume. For example, the controller 110 may output a message for requesting re-measurement of respiration to the driver through a display or may output a voice message through an audio output means. In the meantime, a separate lamp may be installed around the breath sensor. When the respiratory volume is sufficient, the controller 110 may allow a green lamp to be turned on. When re-measurement of breathing is required, the controller 110 may allow a red lamp to be turned on.

The camera captures an image including a driver seated in a driver's seat. When a passenger in addition to the driver is riding in a vehicle, the camera may capture an image including the passenger to determine a location of the passenger. For example, the camera may be installed near the driver's seat inside the vehicle, and may be installed at a location such as a room mirror or a dashboard to capture not only the driver's seat but also the passenger's seat. An embodiment of the installation location and operation of the camera will be described with reference to FIGS. 7A and 7B.

The seat sensor refers to a sensor that is installed on each seat in the vehicle and detects a state where the driver and a passenger are seated. The seat sensor may include a weight sensor or a capacitance sensor. When the driver and/or the passenger is seated, the seat sensor may detect a seating state through the weight of the driver and/or passenger or a change in capacitance depending on the weight. An embodiment of the installation location of the seat sensor will be described with reference to FIG. 8.

When the driver's biometric authentication is completed, the breath sensor may be activated to measure the driver's drunken state. While breath data is measured by the breath sensor, the seat sensor and the camera may be activated to detect locations and states of the driver and the passenger.

The communication device 140 may include a communication module for vehicle network communication with automotive components and/or controllers included in a vehicle. Herein, the technology of the vehicle network communication may include Controller Area Network (CAN) communication, Local Interconnect Network (LIN) communication, Flex-Ray communication, or the like.

Moreover, the communication device 140 may include a communication module for wireless Internet access or a communication module for short range communication. Herein, the wireless Internet technology may include Wireless LAN (WLAN), Wireless Broadband (Wibro), Wi-Fi, World Interoperability for Microwave Access (WiMAX), or the like. Also, the technology of the short-range communication may include Bluetooth, ZigBee, Ultra-Wideband (UWB), Radio Frequency Identification (RFID), Infrared Data Association (IrDA), or the like.

The storage 150 may store data and/or an algorithm required to operate the drunk driving prevention system. For example, the storage 150 may store authentication information of drivers registered in a vehicle. Also, the storage 150 may store a reference condition for determining a driver's drunken state, a command and/or algorithm for measuring a sobriety, or the like. In addition, the storage 150 may store the command and/or algorithm for monitoring the driver's state.

Herein, the storage 150 may include a storage medium such as a Random Access Memory (RAM), a Static Random Access Memory (SRAM), a Read-Only Memory (ROM), a Programmable Read-Only Memory (PROM), or an Electrically Erasable Programmable Read-Only Memory (EEPROM).

When there is a startup request from the driver, the controller 110 performs biometric authentication and performs a sobriety test on the driver before starting the vehicle.

First of all, the controller 110 activates the fingerprint sensor and the microphone for biometric authentication of the driver, and activates the biometric authentication device 160.

Here, as shown in FIG. 4, the fingerprint sensor may be installed on the start button 411 but is not limited thereto.

The fingerprint sensor may transmit scan data, which is obtained by scanning the driver's fingerprint, to the biometric authentication device 160 through the communication device 140.

Referring to FIG. 3, the biometric authentication device 160 may include a fingerprint authentication module 161 and the interactive AI module 165.

The biometric authentication device 160 may drive the fingerprint authentication module 161, may determine whether the driver's fingerprint matches the driver's fingerprint registered in advance, by analyzing the scan data obtained from the fingerprint sensor through the fingerprint authentication module 161, and may authenticate the driver depending on the determined result.

Moreover, referring to reference numeral 511 in FIG. 5A, the microphone may obtain voice data of the driver and may deliver the obtained voice data to the biometric authentication device 160 through the communication device 140. As such, the biometric authentication device 160 may determine whether the obtained voice data matches the voice of a driver registered in advance, by analyzing the voice data obtained from the microphone and may authenticate the driver depending on the result.

Furthermore, as shown in FIG. 5B, the biometric authentication device 160 may drive the interactive AI module 165 and may attempt to communicate with the driver through the interactive AI module 165. The interactive AI module 165 may ask a question to the driver and may authenticate the driver by recognizing the driver's answer to the question.

As such, the biometric authentication device 160 may perform biometric authentication step by step by using the driver's fingerprint, the driver's voice, and question and answer through a conversation with the driver and may deliver the result to the controller 110.

The controller 110 may receive a biometric authentication result of the driver from the biometric authentication device 160. When it is determined that the driver's biometric authentication has failed, the controller 110 may inform the driver of a biometric authentication failure situation, and may wait until the next biometric information is input.

In the meantime, when it is determined that the driver's biometric authentication is successful, the controller 110 activates systems, units and/or functions for measuring the driver's drunken state before the startup of a vehicle. For example, the controller 110 activates a drinking measurement system of the vehicle and a driver monitoring system of the vehicle. Accordingly, the drinking measurement device 170, the driver monitoring device 180, and sensors (e.g., a breath sensor, a seat sensor, and a camera) connected to the drinking measurement device 170 and the driver monitoring device 180 may be activated.

First of all, when the drinking measurement system is activated, the controller 110 may request the driver to measure respiration to obtain breath data from the breath sensor. At this time, the controller 110 may output a message for requesting respiration measurement through a display or an audio output means.

As such, referring to reference numeral 611 in FIG. 6A, when a breath sensor is provided on the steering wheel 11, the driver breathes out toward the breath sensor equipped on the steering wheel. In the meantime, referring to reference numeral 613 in FIG. 6B, when the breath sensor is provided on a dashboard, the driver breathes out toward the breath sensor mounted on the dashboard.

When the driver starts respiration measurement, the breath sensor obtains breath data regarding the driver's breathing flowing into the sensor. Here, the breath data may include information about the driver's respiratory volume and an alcohol component in the inhaled breath.

The drinking measurement device 170 determines a drunken state of the driver based on the breath data from the breath sensor. A respiratory volume of a predetermined amount or more is required to determine the drunken state in the drinking measurement device 170. As such, when the respiratory volume of the driver included in the breath data is less than a reference value, the controller 110 may output a message for requesting re-measurement with the increased respiratory volume, through a display or a voice output means. According to an embodiment, the controller 110 may increase the respiratory volume obtained by driving a fan included in the breath sensor.

The drinking measurement device 170 may determine whether information of an alcohol component in the driver's breath exceeds a first reference value or a second reference value, by analyzing the breath data and may determine the drunken state of the driver based on the result. Here, the first reference value and the second reference value may be set to a blood alcohol content (BAC) value. The first reference value may be set as a BAC value for determining whether alcohol is drunk or not. The second reference value may be a value, which is greater than the first reference value, and may be set to a legal limit of the BAC value determined by the country. Accordingly, the second reference value may be set differently for each country.

For example, when the alcohol concentration in the driver's breath is less than or equal to the first reference value, the drinking measurement device 170 may determine that the driver is not in a drunken state, and may deliver the result to the controller 110.

When the alcohol concentration in the driver's breath exceeds the first reference value, but is less than or equal to the second reference value, the drinking measurement device 170 may determine that the driver in a legally acceptable drunken state, and may deliver the result to the controller 110.

When the alcohol concentration in the driver's breath exceeds the second reference value, the drinking measurement device 170 may determine that the driver is in an unacceptable drunken state, and may deliver the result to the controller 110.

Below, it is described that the alcohol concentration in the driver's breath is measured by using a breath sensor, and then the driver's drunken state is determined, but is not limited thereto. Various methods may be applied to measure the alcohol concentration of the driver, such as measuring the alcohol concentration under the skin in contact with the sensor using infrared rays.

In the meantime, while the driver's drinking measurement operation is performed, a driver monitoring system may be activated.

When the driver monitoring system is activated, the driver monitoring device 180 may monitor states of the driver and passenger by using a seat sensor and a camera.

Figure 7A:
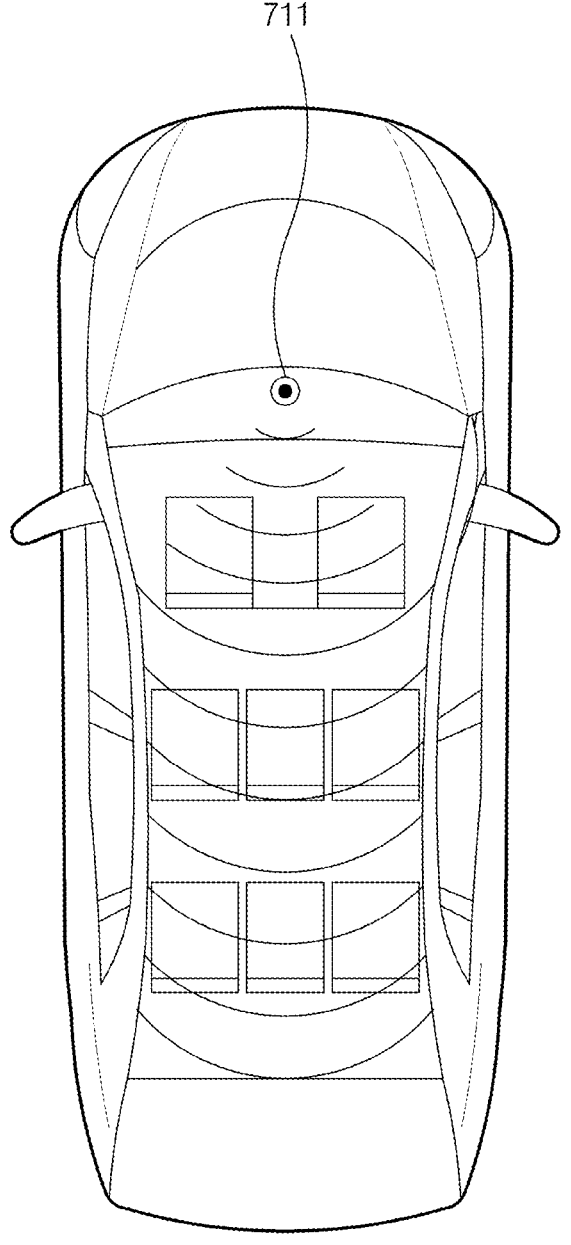
FIGS. 7A, 7B, and 8 are diagrams used to describe a driver monitoring operation, according to an embodiment of the present disclosure.

As shown in FIG. 7A, while the driver's drinking measurement operation is performed, the camera installed at a room mirror location 711 of the vehicle captures an image including the driver's seat and the passenger's seat in the vehicle. In addition, the installation location of the camera may be capable of being changed as much as possible within the shooting range including a location of each seat in the vehicle.

Figure 7B:
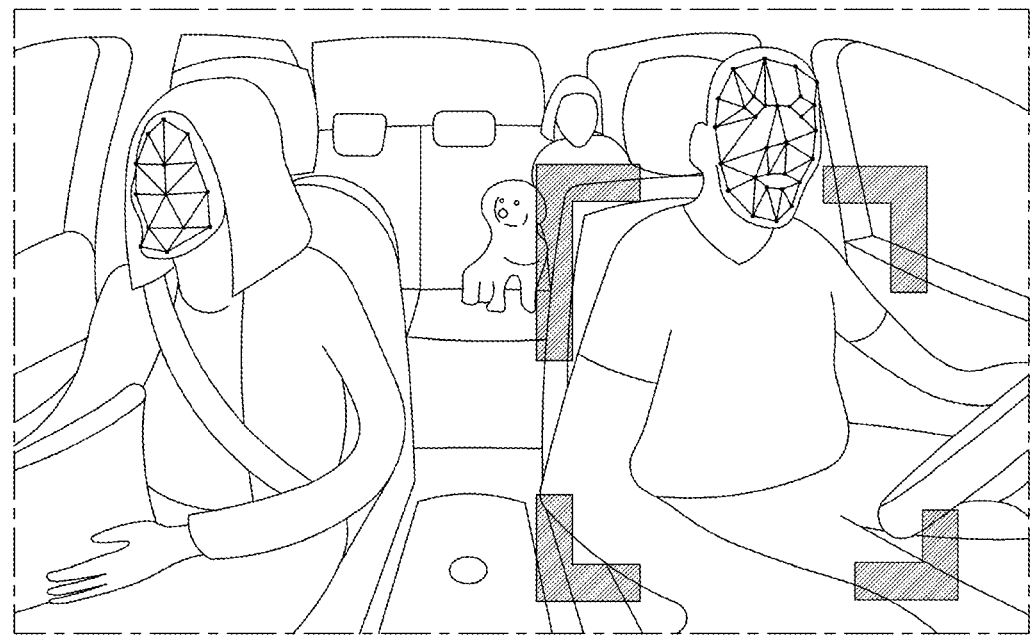

As such, as shown in FIG. 7B, the driver monitoring device 180 recognizes a driver by analyzing the image captured by the camera, identifies a location of the recognized driver, and determines whether a passenger is boarding. When the passenger is boarding, the driver monitoring device 180 identifies a location of the passenger together. In this case, while the drinking measurement operation is performed, the driver monitoring device 180 may determine whether the driver is located in the driver's seat, or whether the passenger is located at the driver's seat location.

Figure 8:
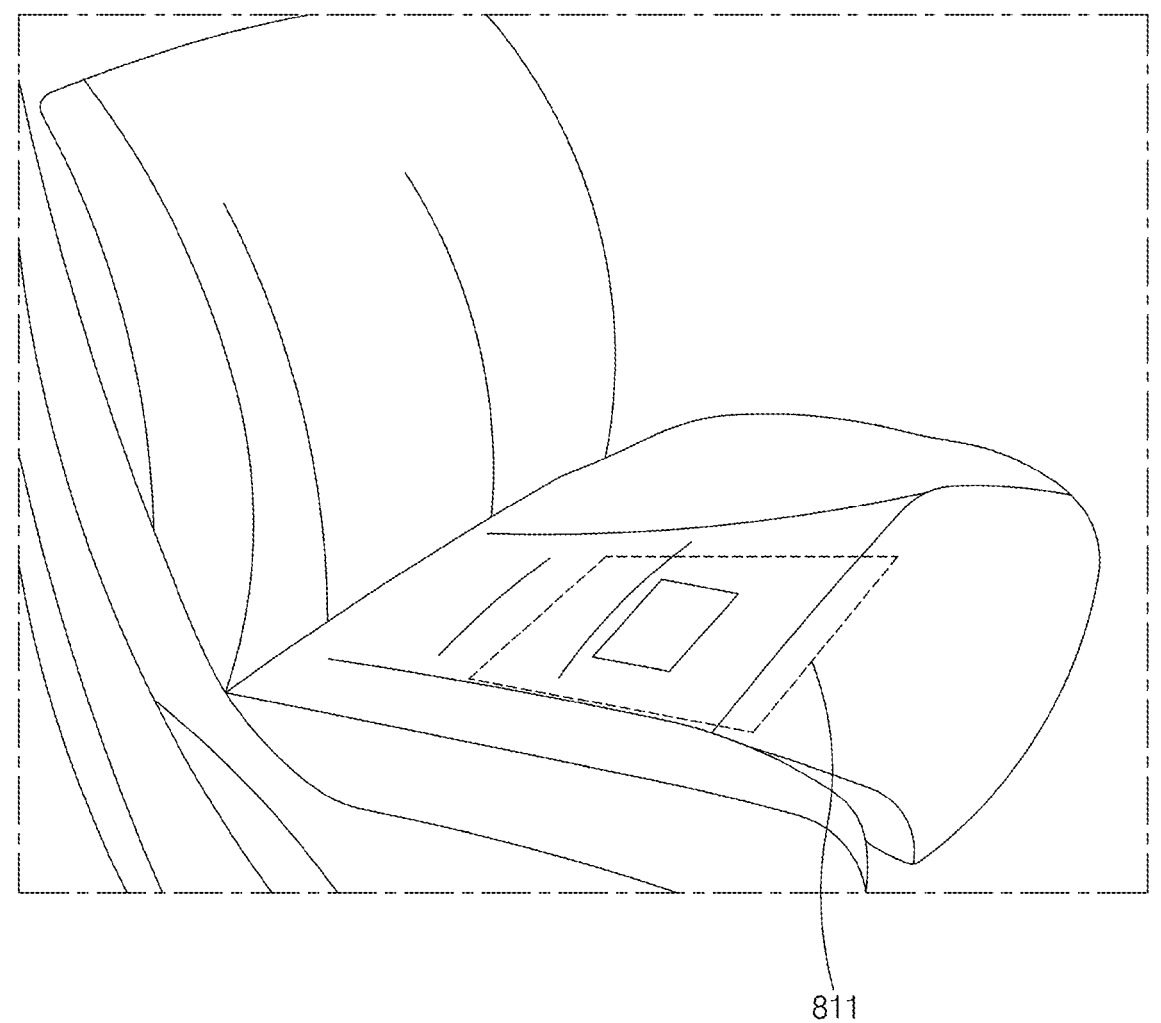

Likewise, as shown in FIG. 8, the driver monitoring device 180 may determine whether the driver and the passenger are on board, and whether the driver and the passenger are seated in proper positions, by using the seat sensor installed on a hip contact surface 811 of each seat in the vehicle.

For example, when information about the driver's weight and body shape are stored, the seat sensor may obtain information such as the passenger's weight and body shape detected in the driver's seat. As such, the driver monitoring device 180 may recognize the driver by comparing the passenger's weight and body shape obtained by the seat sensor with pre-stored information.

The driver monitoring device 180 may determine whether a subject for alcohol testing is the corresponding driver, based on the determination result, and may transmit the result to the controller 110.

As such, until the drinking measurement operation is terminated, the driver monitoring device 180 may continuously monitor the state of the driver. When the passenger is boarding together, the driver monitoring device 180 may also continuously monitor the state of the passenger.

While the drinking measurement operation is performed, when it is determined that the driver is not sitting in the driver's seat, or when it is determined that the passenger is detected at the driver's seat location in a state where the passenger is not seated at the passenger's seat location, the controller 110 may output a warning by determining that the drinking measurement operation has been performed in a dishonest manner. In this case, the controller 110 may end the drinking measurement until the next startup request, and may block startup.

When the driver's drinking measurement is completed, the controller 110 may identify the drinking measurement result of the driver from the drinking measurement device 170, and may determine whether to start up the vehicle, based on the result.

When the drinking measurement device 170 determines that the driver is not in a drunken state, the controller 110 may permit the startup of the vehicle for the corresponding driver. Accordingly, when the startup of the vehicle is permitted by the controller 110, the driving device 190 drives a startup device.

Furthermore, when the drinking measurement device 170 determines that the driver in a legally acceptable drunken state, the controller 110 may permit the startup of the vehicle for the corresponding driver. However, because the driver is in the state of drinking alcohol, the controller 110 may continuously monitor the state of the driver even after the startup of the vehicle by activating a driver monitoring system.

In the meantime, when the drinking measurement device 170 determines that the driver is in a drunken state, the controller 110 may block the startup of the vehicle for the corresponding driver and may notify the driver that the startup is blocked due to drinking.

As such, when the startup of the vehicle is blocked by the controller 110, the driving device 190 may lock the startup device such that the startup is impossible.

The drunk driving prevention system according to the present embodiment operating as described above may be implemented in the form of an independent hardware device including a memory and a processor for processing each operation and may be driven in the form included in other hardware devices such as a microprocessor or a general purpose computer system.

The operation flow of the drunk driving prevention system according to an embodiment of the present disclosure will be described in more detail as follows.

Figure 9:
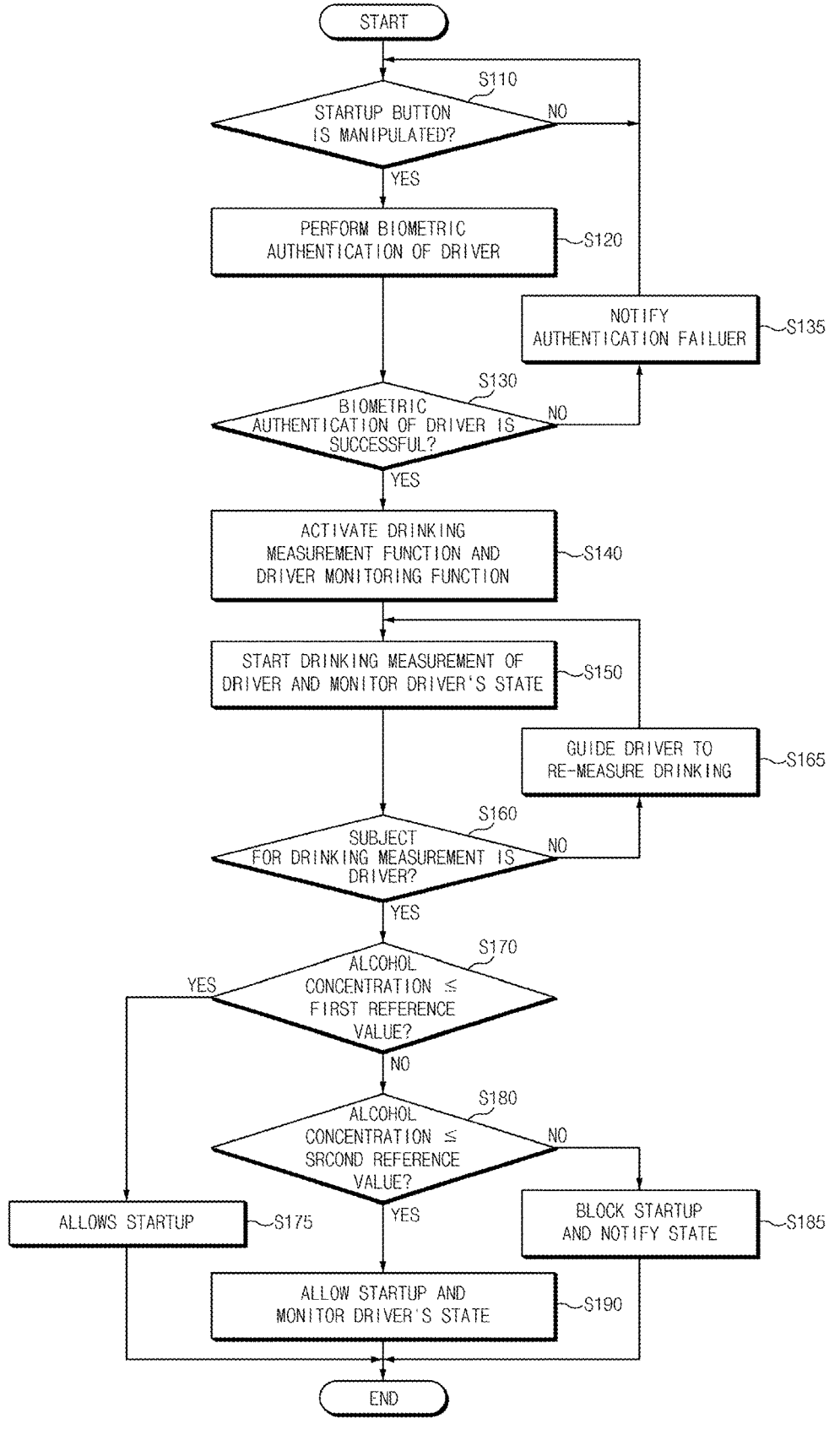
FIG. 9 is a diagram illustrating an operation flow for a method for preventing drunk driving, according to an embodiment of the present disclosure.

FIG. 9 is a diagram illustrating an operation flow for a method for preventing drunk driving, according to an embodiment of the present disclosure.

Referring to FIG. 9, when a startup button of the vehicle is manipulated (S110), a drunk driving prevention system performs biometric authentication of a driver (S120). In a process S120, the drunk driving prevention system may perform the biometric authentication of the driver through the driver's fingerprint, voice, and question and answer.

When the driver's biometric authentication fails (S130), the drunk driving prevention system notifies the driver of the biometric authentication failure situation (S135).

In the meantime, when the biometric authentication of the driver is successful in a process of 'S130', the drunk driving prevention system activates a drinking measurement function and a driver monitoring function (S140), and starts the drinking measurement for the driver and driver state monitoring (S150).

Through the driver state monitoring during drinking measurement, the drunk driving prevention system determines whether a subject for alcohol testing matches the driver. When it is determined that the subject for alcohol testing is not the driver (S160), the drunk driving prevention system guides the driver to re-measure drinking (S165). When the measured respiratory volume of the driver is less than a reference value, the drunk driving prevention system may guide a drinking re-measurement.

When the subject for alcohol testing is a driver and the alcohol test is completed, the drunk driving prevention system identifies the alcohol concentration measured from the driver.

In this case, when the alcohol concentration of the driver is equal to or less than a first reference value (S170), the drunk driving prevention system allows the startup of a vehicle (S175).

Furthermore, when the alcohol concentration of the driver exceeds the first reference value and is less than a second reference value (S180), the drunk driving prevention system allows the startup of the vehicle, but monitors the driver's state (S190).

In the meantime, when the alcohol concentration of the driver exceeds the second reference value (S180), the drunk driving prevention system blocks the startup of the vehicle and notifies a startup blocking state (S185).

As described above, according to an embodiment of the present disclosure, a system and method for preventing drunk driving may prevent the drunk driving in advance by blocking vehicle startup in a case of a drunken state that the driver's blood alcohol concentration exceeds a legal limit, and may strongly prevent drinking accidents from occurring by strengthening the driver's biometric authentication and preventing another person from performing the alcohol measurement instead of the driver through driver monitoring.

The above description is merely an example of the technical idea of the present disclosure, and various modifications and modifications may be made by one skilled in the art without departing from the essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

According to an embodiment of the present disclosure, it is possible to make it easy to check a driver and to measure a sobriety test by simultaneously monitoring states of the driver and a passenger in a vehicle when the driver performs a sobriety test while driver authentication is performed through several steps, and to prevent a drunk driving accident by blocking vehicle starting when the driver is in drunken state.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A drunk driving prevention system, comprising:
   a biometric authentication device configured to perform biometric authentication on a driver step-by-step at a request of startup of a vehicle;
   a drinking measurement device configured to measure a drunken state of the driver who completes the biometric authentication, wherein the drinking measurement device includes a drinking measurement sensor to obtain information about a driver's respiratory volume and an alcohol component in a driver's inhaled breath, the drinking measurement sensor is located in a fan or a display of the vehicle;
   a driver monitoring device configured to monitor a state of the driver in the vehicle while measuring the drunken state of the driver by detecting, using a monitoring sensor, a weight and a body shape of a person seating on a driver's seat and a weight and a body shape of a passenger seating a passenger's seat; and
   a controller configured to:
   activate a drinking measurement operation of the drinking measurement device and a driver state monitoring operation of the driver monitoring device when the biometric authentication of the driver is successful,
   wherein the drinking measurement operation includes:
   receiving information about the weight and the body shape of the person seating on the driver's seat, comparing the information about the weight and the body shape of the person seating on the driver's seat with stored information about a weight and a body shape of a driver and determines whether the driver is in the driver's seat,
   determining whether the driver's respiratory volume obtained by the drinking measurement sensor is sufficient to measure the drunken state of the driver;
   in response to a determination that the driver is not in the driver's seat, or the driver's respiratory volume is insufficient, outputting a message for requesting re-measurement of respiration on the display and operating a red lamp on the drinking measurement sensor to provide a visualized signal for the re-measurement of respiration,
   in response to a determination that the driver is in the driver's seat and the driver's respiratory volume is sufficient, allowing or blocking the startup of the vehicle based on a result of the measuring of the drunken state of the driver;
   wherein the driver state monitoring operation includes:
   comparing the weight and the body shape of the passenger seating the passenger's seat with stored information about the weight and the body shape of the driver and determining whether the driver is in the driver's seat during the drinking measurement operation; and
   in response to a determination that the driver is not in the driver's seat outputting a warning and terminates the drinking measurement operation.

2. The system of claim 1, wherein the biometric authentication device performs the biometric authentication of the driver step-by-step by using fingerprint recognition of the driver, speech recognition of the driver, and question and answer through conversation with the driver.

3. The system of claim 2, wherein the biometric authentication device includes:
   a fingerprint recognition module configured to recognize the driver by determining whether a fingerprint obtained from the driver matches a pre-registered fingerprint of the driver; and
   an interactive artificial intelligence (AI) module configured to query the driver by recognizing a voice of the driver, and to recognize the driver from an answer of the driver to the query.

4. The system of claim 1, wherein the drinking measurement device measures the drunken state of the driver by comparing alcohol concentration information of the driver obtained from the drinking measurement sensor installed in the vehicle with a predetermined first reference value and a predetermined second reference value, when the drinking measurement operation is activated.

5. The system of claim 4, wherein the driver monitoring device monitors the state of the driver while drinking measurement of the driver is being performed, and determines whether a subject for alcohol testing is the driver when the driver state monitoring operation is activated.

6. The system of claim 4, wherein the predetermined first reference value is set to a blood alcohol concentration value for determining whether alcohol is drunk, and wherein the predetermined second reference value is set to a legal limit of blood alcohol concentration determined by a country.

7. The system of claim 6, wherein the drinking measurement device determines that the driver is not in the drunken state when alcohol concentration of the driver is equal to or less than the predetermined first reference value, and wherein the controller allows the startup of the vehicle, when it is identified that the driver is not in the drunken state.

8. The system of claim 6, wherein the drinking measurement device determines that the driver is in a legally acceptable drunken state when alcohol concentration of the driver exceeds the predetermined first reference value and is equal to or less than the predetermined second reference value, and wherein the controller allows the startup of the vehicle, and activates the driver state monitoring operation during the startup of the vehicle, when it is determined that the driver is in the legally acceptable drunken state.

9. The system of claim 6, wherein the drinking measurement device determines that the driver is in the drunken state when alcohol concentration of the driver exceeds the predetermined second reference value, and wherein the controller blocks the startup of the vehicle when it is identified that the driver is in the drunken state.

10. A method for preventing drunk driving, the method comprising:

performing, by a biometric authentication device, biometric authentication on a driver step-by-step at a request of startup of a vehicle;

measuring, by a drinking measurement device, a drunken state of the driver who completes the biometric authentication, wherein the drinking measurement device includes a drinking measurement sensor to obtain information about a driver's respiratory volume and an alcohol component in a driver's inhaled breath, the drinking measurement sensor is located in a fan or a display of the vehicle;

monitoring, by a driver monitoring device, a state of the driver in the vehicle while measuring the drunken state of the driver by detecting, using a monitoring sensor, a weight and a body shape of a person seating on a driver's seat and a weight and a body shape of a passenger seating a passenger's seat;

activating a drinking measurement operation of the drinking measurement device and a driver state monitoring operation of the driver monitoring device when the biometric authentication of the driver is successful;

wherein the drinking measurement operation includes:

receiving information about the weight and the body shape of the person seating on the driver's seat;

comparing the information about the weight and the body shape of the person seating on the driver's seat with stored information about a weight and a body shape of a driver and determines whether the driver is in the driver's seat;

determining whether the driver's respiratory volume obtained by the drinking measurement sensor is sufficient to measure the drunken state of the driver;

in response to a determination that the driver is not in the driver's seat, or the driver's respiratory volume is insufficient, outputting a message for requesting re-measurement of respiration on the display and operating a red lamp on the drinking measurement sensor to provide a visualized signal for the re-measurement of respiration;

in response to a determination that the driver is in the driver's seat and the driver's respiratory volume is sufficient, allowing or blocking, by a controller, the startup of the vehicle based on a result of the measuring of the drunken state of the driver; and wherein the driver state monitoring operation includes:

comparing the weight and the body shape of the passenger seating the passenger's seat with stored information about the weight and the body shape of the driver and determining whether the driver is in the driver's seat during the drinking measurement operation; and in response to a determination that the driver is not in the driver's seat outputting a warning and terminates the drinking measurement operation.

11. The method of claim 10, wherein the performing, by a biometric authentication device, biometric authentication on a driver step-by-step at a request of startup of a vehicle includes:

performing the biometric authentication through fingerprint recognition of the driver;

performing the biometric authentication through speech recognition of the driver; and performing the biometric authentication by using a question and answer through conversation with the driver by driving an interactive AI module.

12. The method of claim 10, wherein the measuring of the drunken state includes:

comparing, by the drinking measurement device, alcohol concentration information of the driver obtained from the drinking measurement sensor installed in the vehicle with a predetermined first reference value and a predetermined second reference value in response to activation of the drinking measurement operation; and determining, by the drinking measurement device, that:

the driver is not in the drunken state in response to an alcohol concentration of the driver being equal to or less than the predetermined first reference value, the driver is in a legally acceptable drunken state in response to the alcohol concentration of the driver exceeding the predetermined first reference value and being equal to or less than the predetermined second reference value, and the driver is in the drunken state in response to the alcohol concentration of the driver exceeding the predetermined second reference value.

13. The method of claim 12, wherein the predetermined first reference value is set to a blood alcohol concentration value for determining whether alcohol is drunk, and wherein the predetermined second reference value is set to a legal limit of blood alcohol concentration determined by a country.

14. The method of claim 12, wherein the allowing or blocking of the startup of the vehicle includes:

allowing, by the controller, the startup of the vehicle in response to identification that the driver is not in the drunken state;

allowing, by the controller, the startup of the vehicle, and activating the driver state monitoring operation during the startup of the vehicle in response to identification that the driver is in the legally acceptable drunken state; and blocking, by the controller, the startup of the vehicle in response to identification that the driver is in the drunken state.

\* \* \* \* \*